United States Patent [19]

Tokunaga et al.

[11] 4,040,525
[45] Aug. 9, 1977

[54] METHOD AND APPARATUS FOR STACKING INGOTS ACCORDING TO PREDETERMINED ARRANGEMENTS

[75] Inventors: Koichi Tokunaga; Akira Fukuda, both of Kamagaya, Japan

[73] Assignee: Mitsui Mining & Smelting Co., Ltd., Tokyo, Japan

[21] Appl. No.: 695,962

[22] Filed: June 14, 1976

[30] Foreign Application Priority Data

Sept. 22, 1975 Japan .............................. 50-114500

[51] Int. Cl.² ............................................ B65G 57/22
[52] U.S. Cl. .................................. 214/6 P; 198/374; 198/403; 164/130; 164/131; 164/269; 214/152
[58] Field of Search ................... 214/6 P, 6 DK, 6 G, 214/6.5, 152; 198/374, 403, 404; 164/130, 131, 269, 329

[56] References Cited

U.S. PATENT DOCUMENTS

| 3,583,472 | 6/1971 | Yamamoto et al. ................. 164/269 |
| 3,876,094 | 4/1975 | Ojanen et al. .................... 214/6 P X |
| 3,921,705 | 11/1975 | Furuse et al. ......................... 164/269 |
| 3,972,368 | 8/1976 | Kikkawa et al. ................ 164/269 X |

FOREIGN PATENT DOCUMENTS

| 956,865 | 4/1964 | United Kingdom ................. 164/269 |
| 1,154,218 | 6/1969 | United Kingdom ................. 214/6 P |

*Primary Examiner*—L. J. Paperner

[57] ABSTRACT

A method and apparatus for grouping metal ingots of predetermined shape into ingot groups each consisting of four ingots and stacking these ingot groups in tiers to form a stack. In the method and apparatus, two kinds of ingot groups of different patterns are automatically alternately stacked in tiers utilizing the movement of a conveyor conveying the ingots, so that dangerous relative sliding movement of the ingots in the stack may not occur during transportation.

8 Claims, 24 Drawing Figures

METHOD AND APPARATUS FOR STACKING INGOTS ACCORDING TO PREDETERMINED ARRANGEMENTS

BACKGROUND OF THE INVENTION

This invention relates to methods and apparatus for stacking ingots of metal cast continuously by an automatic casting apparatus, and more particularly to a method and apparatus for automatically arranging such ingots into groups of predetermined arrangements and stacking the ingot groups in alternate tiers.

A continuous casting apparatus is widely used presently for continuously casting a nonferrous metal such as zinc into ingots. In the continuous casting apparatus, the metal in molten form is cast into a multiplicity of molds carried by an endless chain conveyor, and while moving the chain conveyor, dust or scum floating on the surface of the molten metal cast into the molds is removed and, at the same time, the metal cast into the molds is cooled to obtain ingots. A plurality of ingots thus cast by the continuous casting apparatus are grouped into an ingot group (referred to hereinafter as a stack unit) in which such ingots are arranged to form a horizontal layer, and a predetermined number of such stack units are stacked in tiers and tied together by a metal wire or band to constitute a stack of predetermined weight. The stack thus formed is then transported to the delivery or stored in a warehouse. However, difficulty is encountered in successfully tying the stack, and dangerous sliding movement of the ingots relative to one another in the stack may occur during transportation, when a plurality of ingots delivered from the molds carried by the chain conveyor are merely grouped into the stack unit, and a predetermined number of such stack units are merely stacked in tiers to constitute the stack of predetermined weight.

Figure 1A:
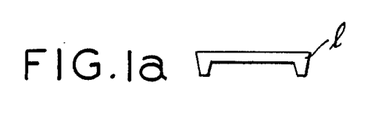
FIG. 1a is a front elevational view of a legged ingot.
Figure 1B:
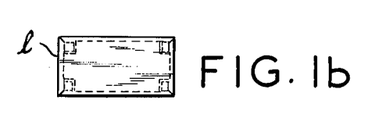
Figure 1C:
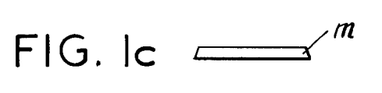
FIG. 1c is a front elevational view of a plain ingot.
Figure 1D:
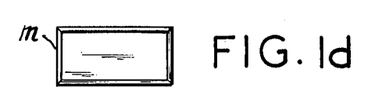
FIG. 1d is a plan view of FIG. 1c.
Figure 1E:
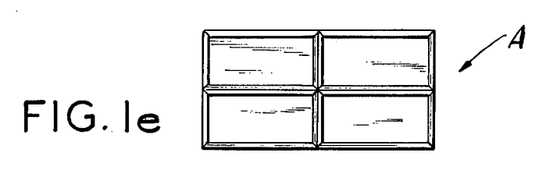
FIG. 1e is a plan view of an ingot group or stack unit consisting of four ingots grouped according to a pattern A, in which the four ingots are arranged in two parallel rows in each of which the two ingots are longitudinally aligned.
Figure 1F:
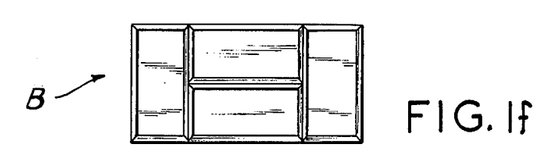
FIG. 1f is a plan view of another ingot group or stack unit consisting of four ingots grouped according to a pattern B, in which two of the four ingots are arranged in longitudinally parallel relation, and the remaining two are arranged in longitudinally normal relation to the longitudinal direction of the former ingots on opposite sides thereof.

A method of alternately stacking two kinds of ingot groups of different patterns in tiers has been proposed in an effort to provide a stack consisting of stack units in which the ingots can be grouped into the respective patterns with a minimum of grouping steps while avoiding dangerous relative sliding movement of the ingots in the stack during tying and transportation. According to this proposed method, ingots are grouped to constitute two kinds of stack units each consisting of four ingots arranged in patterns A and B as shown in FIGS. 1e and 1f respectively. In the pattern A shown in FIG. 1e, the four ingots are arranged in two parallel rows in each of which the two ingots are longitudinally aligned, while in the pattern B shown in FIG. 1f, two of the four ingots are arranged in longitudinally parallel relation, and the remaining two are arranged in longitudinally normal relation to the longitudinal direction of the former ingots on opposite sides thereof.

The ingots have hitherto been grouped into the patterns A and B by the manual, and various studies have been made in an effort to automatically group the ingots into such patterns mechanically instead of manually. However, this automatic mechanical grouping has not yet been proved fully successful because a gap is inevitably produced between the ingots during grouping by mechanical means resulting in difficulty of sufficiently securely tying the ingots. A conveying machine such as a fork lift is generally used especially when the ingots tied together are conveyed by or loaded on or unloaded from vehicles or railway cars. In such a case, a stack consisting solely of plain ingots as shown in FIGS. 1c and 1d is difficult to be conveyed by the conveying machine, and the lowermost layer of the stack must be composed of legged ingots as shown in FIGS. 1a and 1b so that the stack can be successfully conveyed. In other words, the legged ingots must be disposed with their legs directed downward to constitute the lowermost layer of the stack, and the plain ingots must then be stacked in tiers on the lowermost layer. Therefore, in order to tie together the stacked ingots, the legged ingots must be arranged in either the pattern A or the pattern B, and then, the plain ingots arranged according to the patterns A and B must be stacked in alternate tiers on the legged ingots constituting the lowermost layer of the stack.

However, the ingots must be tied together by an automatic tying machine at a rate which corresponds to the rate of casting the ingots by the continuous casting apparatus, because an undesirable reduction in the ingot casting efficiency is inevitably given rise to when the rate of tying the ingots is less than the rate of casting the ingots by the continuous casting apparatus. It has become necessary, therefore, to suitably modify or improve the automatic tying machine so that the ingots can be tied together at the rate corresponding to the rate of casting the ingots by the continuous casting apparatus. Further, the prior art method used for stacking the ingots in tiers has been defective in that the factors including the inevitable formation of the gap between the grouped ingots result in dangerous relative sliding movement of the ingots during tying or transportation.

SUMMARY OF THE INVENTION

An object of the present invention is to provide a novel and improved method and apparatus for automatically mechanically grouping ingots into stack units each consisting of four ingots and stacking a plurality of such stack units in tiers to constitute a stack.

Another object of the present invention is to provide a method and apparatus for automatically mechanically stacking in alternate tiers two kinds of stack units consisting of ingots arranged in different patterns thereby constituting a trouble-free stack in which dangerous relative sliding movement of the ingots does not occur.

Still another object of the present invention is to provide a method and apparatus for automatically grouping ingots into two kinds of stack units of different patterns with a minimum of grouping steps, in which the four ingots forming the stack unit of the first kind are grouped in one of the patterns utilizing the arrangement of the ingots as they are successively delivered from ingot casting molds of a continuous casting apparatus onto a main conveyor, and the four ingots forming the stack unit of the second kind are grouped by rotating two of the ingots in the stack unit of the first kind, 90° relative to the remaining two.

Yet another object of the present invention is to provide a method and apparatus for automatically stacking a plurality of stack units in tiers to constitute a stack, in which the stack unit forming the lowermost layer of the stack consists of four legged ingots and the stack units stacked on the lowermost layer to form the alternate layers consist of four plain ingots of two different patterns, so that the stack can be easily tied by a metal wire or band, and the forks of a fork lift or like conveying machine can be easily inserted beneath the bottom of the stack.

A further object of the present invention is to provide a method and apparatus for automatically grouping ingots into stack units in which the ingots are brought into gap-free contact with one another, although the ingots delivered from the molds are conveyed in spaced apart relation by the main conveyor toward the ingot grouping station.

BRIEF DESCRIPTION OF THE DRAWINGS

FIG. 1b is a plan view of FIG. 1a.

DETAILED DESCRIPTION OF THE INVENTION

A preferred embodiment of the apparatus according to the present invention will now be described with reference to the drawings.

Figure 1G:
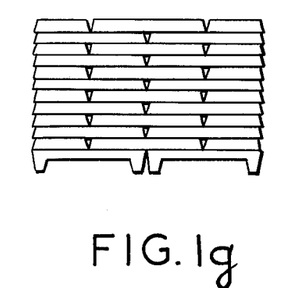
FIG. 1g is a front elevational view of a stack formed by stacking in alternate tiers the stack unit of pattern A shown in FIG. 1e and that of pattern B shown in FIG. 1f.
Figure 1H:
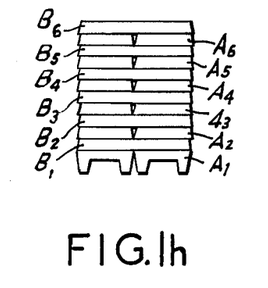
FIG. 1h is a side elevational view of FIG. 1g.

An endless chain conveyor 1 of a continuous casting apparatus (not shown) is provided with a pair of mold trains extending in parallel with each other along the running direction thereof for molding plain ingots and legged ingots of nonferrous metal, and each of the mold pairs disposed in the trains across the conveyor 1 is of the same kind. According to the present invention, a plurality of (for example, twelve) stack units of patterns A and B as shown in FIGS. 1e and 1f are alternately stacked in tiers to constitute a stack as shown in FIGS. 1g and 1h. For this purpose, 22 molds 2a used for molding plain ingots $m$ as shown in FIGS. 1c and 1d are arranged in each row along the running direction and are followed by two molds 2b used for molding legged ingots $l$ as shown in FIGS. 1a and 1b so as to complete one cycle required for constituting one stack, and a plurality of such cycles are provided on the endless chain conveyor 1.

Figure 4:
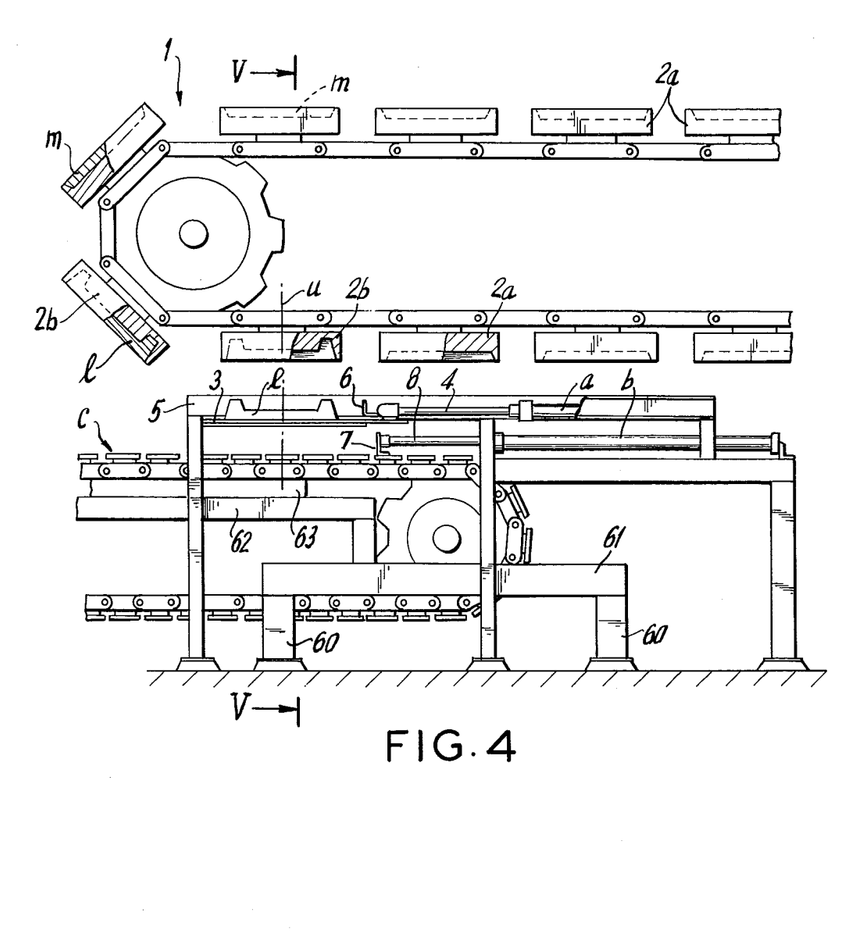
FIG. 4 is an enlarged view of the part IV shown in FIG. 3.
Figure 5:
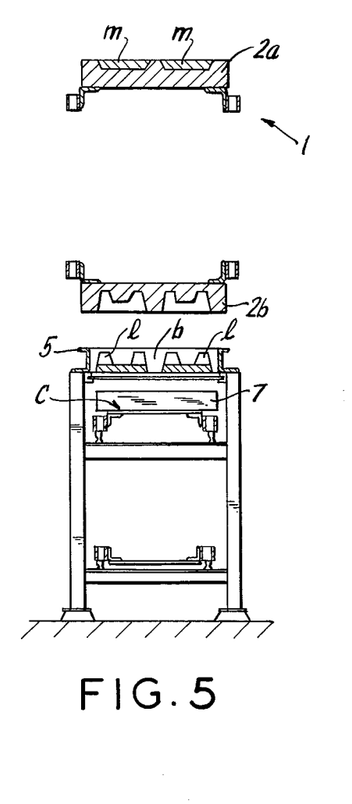
FIG. 5 is a sectional view taken on the line V—V in FIG. 4.

An ingot receiving member 3 is disposed between the lower run of the chain conveyor 1 adjacent to the ingot delivery end thereof and the upper run of an endless main conveyor $c$ adjacent to the ingot receiving end thereof. This ingot receiving member 3 is mounted to a frame member 5 for reciprocating movement in the frame member 5 so as to receive a pair of ingots of the same kind when they are conveyed to the one-dot chain line position shown in FIG. 4 and released from the molds 2 by the force imparted by a hammer (not shown). The ingot receiving member 3 is connected to a piston rod 4 of a fluid cylinder $a$ mounted to the frame member 5 for driving the ingot receiving member 3. A stop plate 6 is fixed to the frame member 5 and extends above the ingot receiving member 3 to engage the ingots on the ingot receiving member 3 during retracting movement of the receiving member 3 so as to restrict the movement of the ingots together with the retracting receiving member 3. Thus, with the retracting movement of the receiving member 3, the two ingots of the same kind are delivered onto the main conveyor $c$ in the state in which the longitudinal centerline thereof registers with the conveying direction of the main conveyor $c$. The main conveyor $c$ is mounted on beams 61 fixed to support columns 60, and a fluid cylinder $b$ is disposed above the main conveyor $c$. Rollers of the main conveyor $c$ is supported on the rails 63. A push plate 7 is connected to a piston rod 8 of the fluid cylinder $b$ for advancing the ingots delivered onto the main conveyor $c$ from the ingot receiving member 3 by a predetermined distance when the main conveyor $c$ ceased to move temporarily. A pattern changing device 10 for changing the pattern of the ingot groups is disposed above the intermediate portion of the upper run of the main conveyor $c$ which is driven by a drive source 9 for conveying the ingots in the form of two parallel trains.

Figure 6:
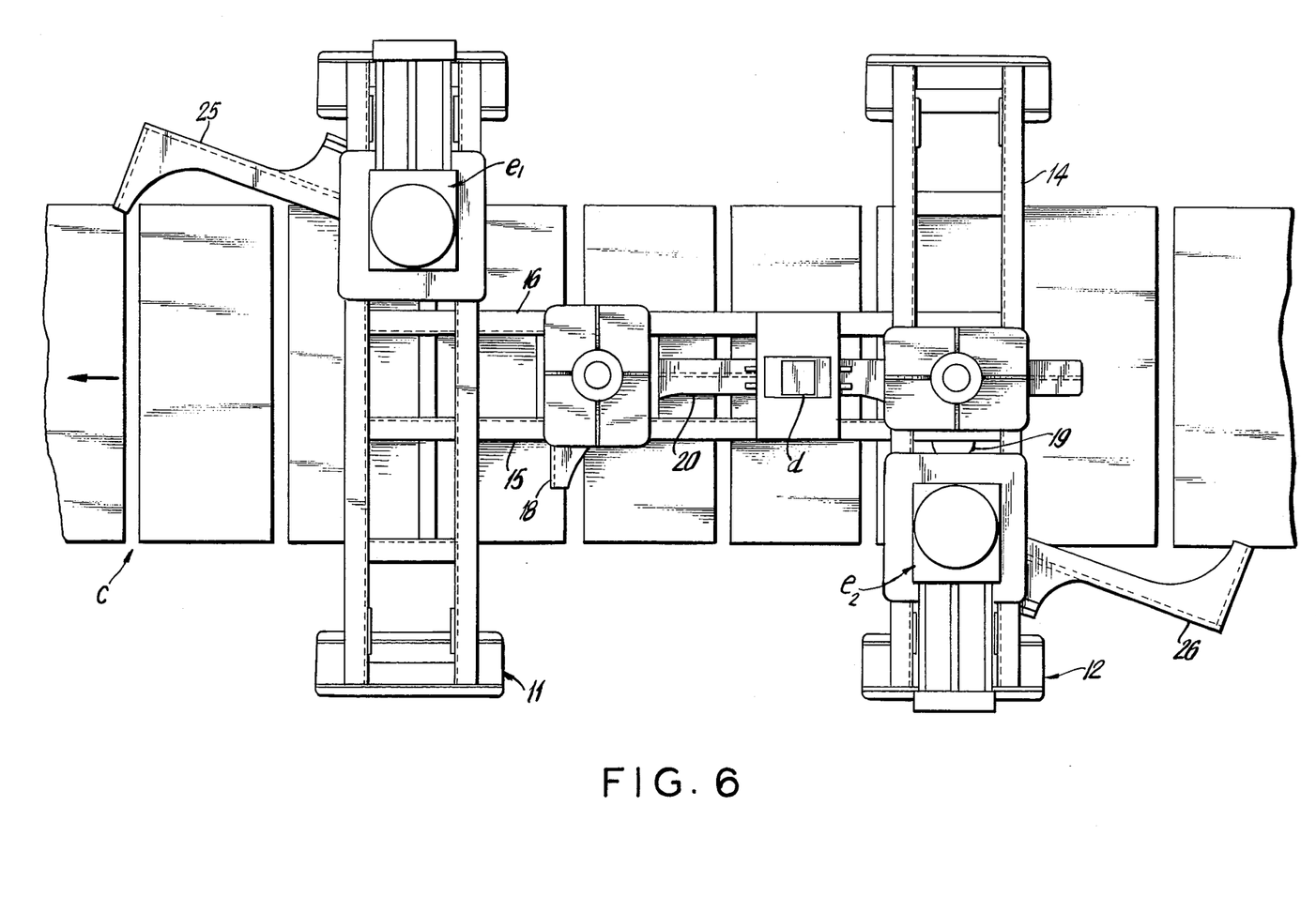
FIGS. 6, 7 and 8 are enlarged detail views of means for changing the pattern of the ingot group.
Figure 7:
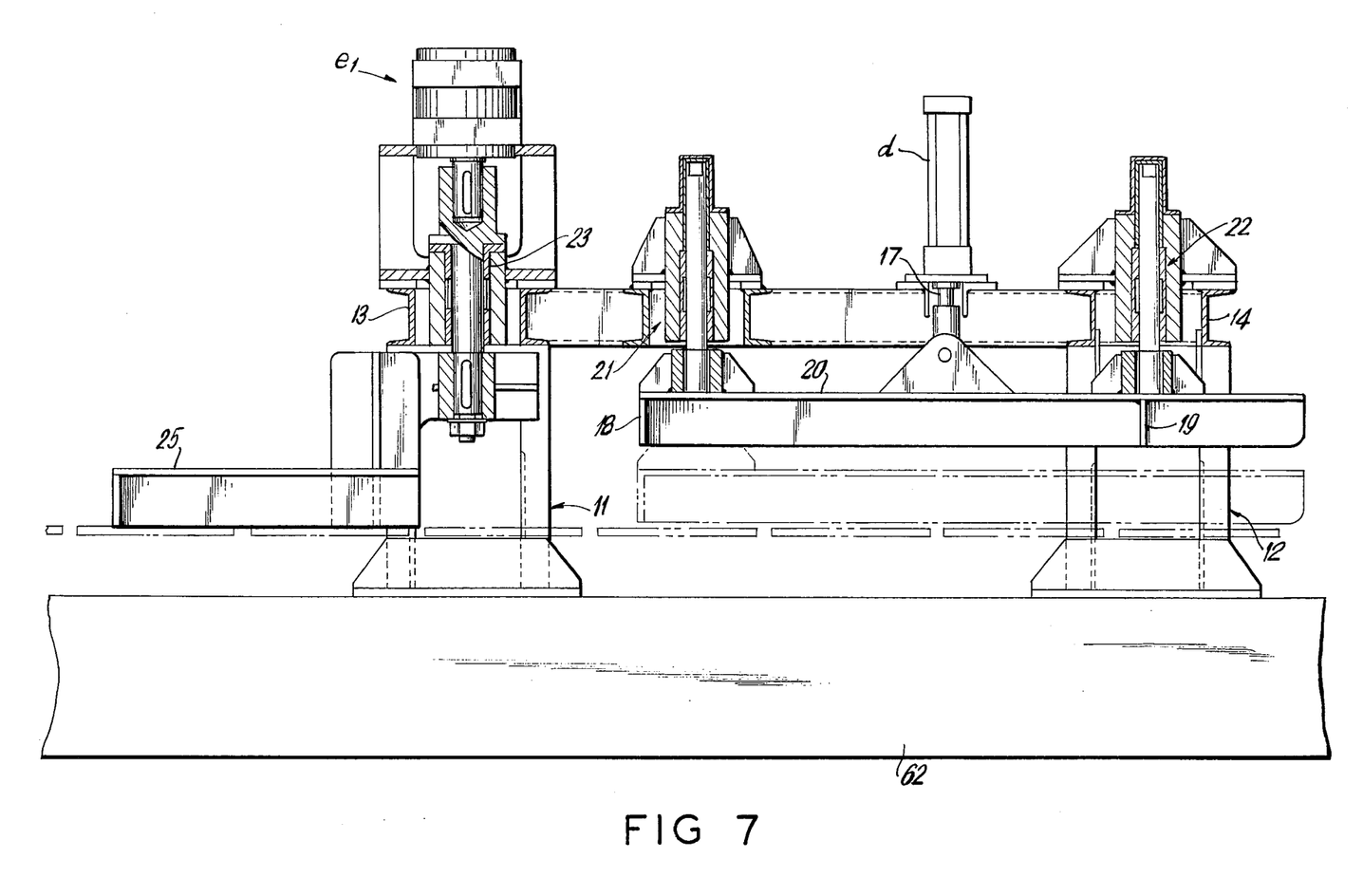
Figure 8:
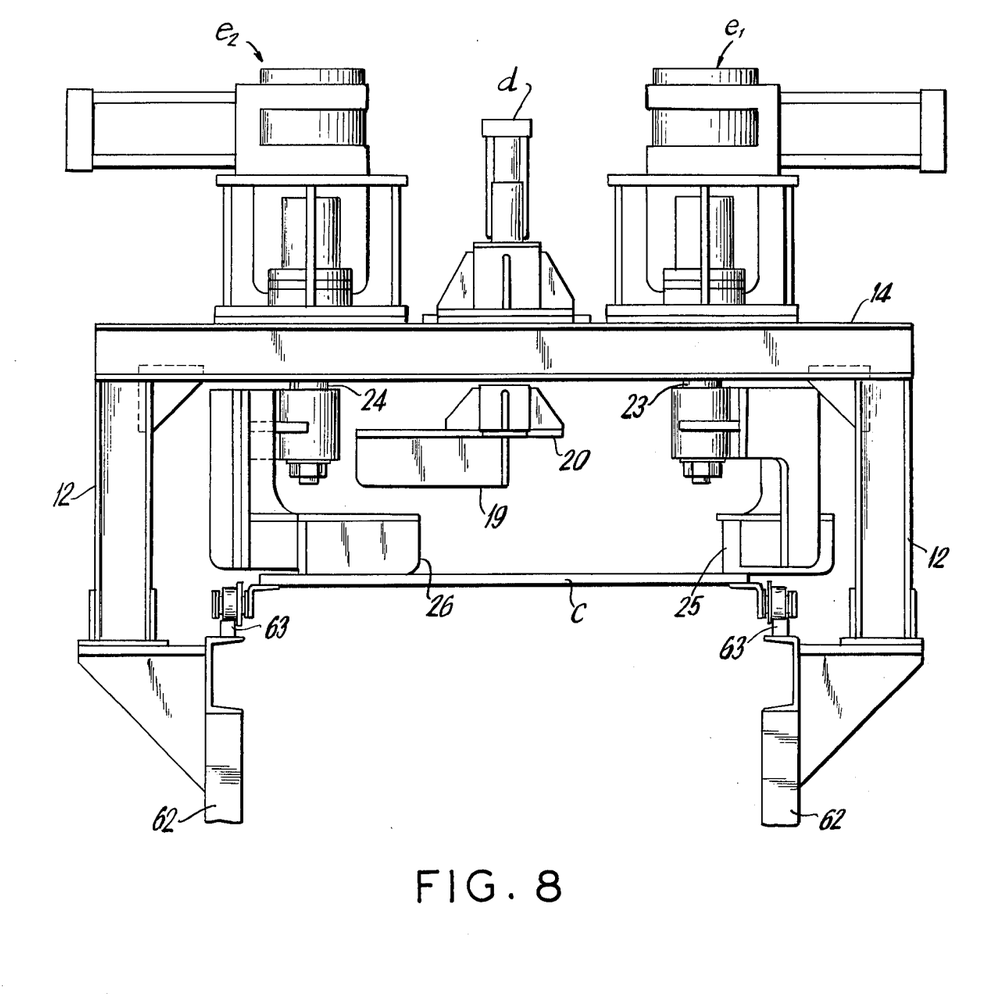

The structure of this pattern changing device 10 is shown in detail in FIGS. 6 to 8. Referring to FIGS. 6 to 8, a pair of spaced gantry-like frame structures 11 and 12 are mounted on beams 62 to span across the main conveyor $c$, and a pair of spaced beams 15 and 16 extend between the cross members 13 and 14 of the gantry-like frame structures 11 and 12. A fluid cylinder $d$ is mounted upright on the spaced beams 15 and 16 and has a piston rod 17 connected at the lower end thereof to a first stopper 20. This first stopper 20 comprises a pair of spaced stop plates 18 and 19 for engaging the two successive ingots in the same train among the four being conveyed by the main conveyor $c$. The first stopper 20 is urged toward and away from the main conveyor $c$ with the vertical movement of the piston rod 17 of the fluid cylinder $d$. Guide means 21 and 22 are provided at the front and rear ends respectively of the first stopper 20 so as to accurately guide the vertical movement of the first stopper 20 toward and away from the main conveyor $c$.

A pair of spaced rotary actuators $e_1$ and $e_2$ are mounted respectively on the cross members 13 and 14 of the gantry-like frame structures 11 and 12 at positions as best shown in FIG. 6. Rotary arms 25 and 26 are mounted to respective actuating shafts 23 and 24 of the rotary actuators $e_1$ and $e_2$ and can make swinging movement through a predetermined angle over the main conveyor c. The rotary arm 25 is actuated by the rotary actuator $e_1$ mounted on the cross members 13 of the gantry-like frame structure 11 located forward relative to the frame structure 12 in the advancing direction of the main conveyor c and acts to engage one of the ingots which are not engaged by the first stopper 20. On the other hand, the rotary arm 26 is actuated by the rotary actuator $e_2$ mounted on the cross members 14 of the gantry-like frame structure 12 located rearward relative to the frame structure 11 in the advancing direction of the main conveyor c and acts to engage one of the ingots engaged by the rear stop plate 19 of the first stopper 20. Both these rotary arms 25 and 26 are actuated to swing through the predetermined angle so that the attitude of the ingots engaged thereby can be changed by 90°. The first stopper 20 and rotary arms 25, 26 operate only when the stack unit of pattern B is to be formed, and otherwise, the first stopper 20 is retracted to stand by at the position above the main conveyor c, while the rotary arms 25 and 26 are urged away from the main conveyor c to stand by at such retracted positions.

Figure 2:
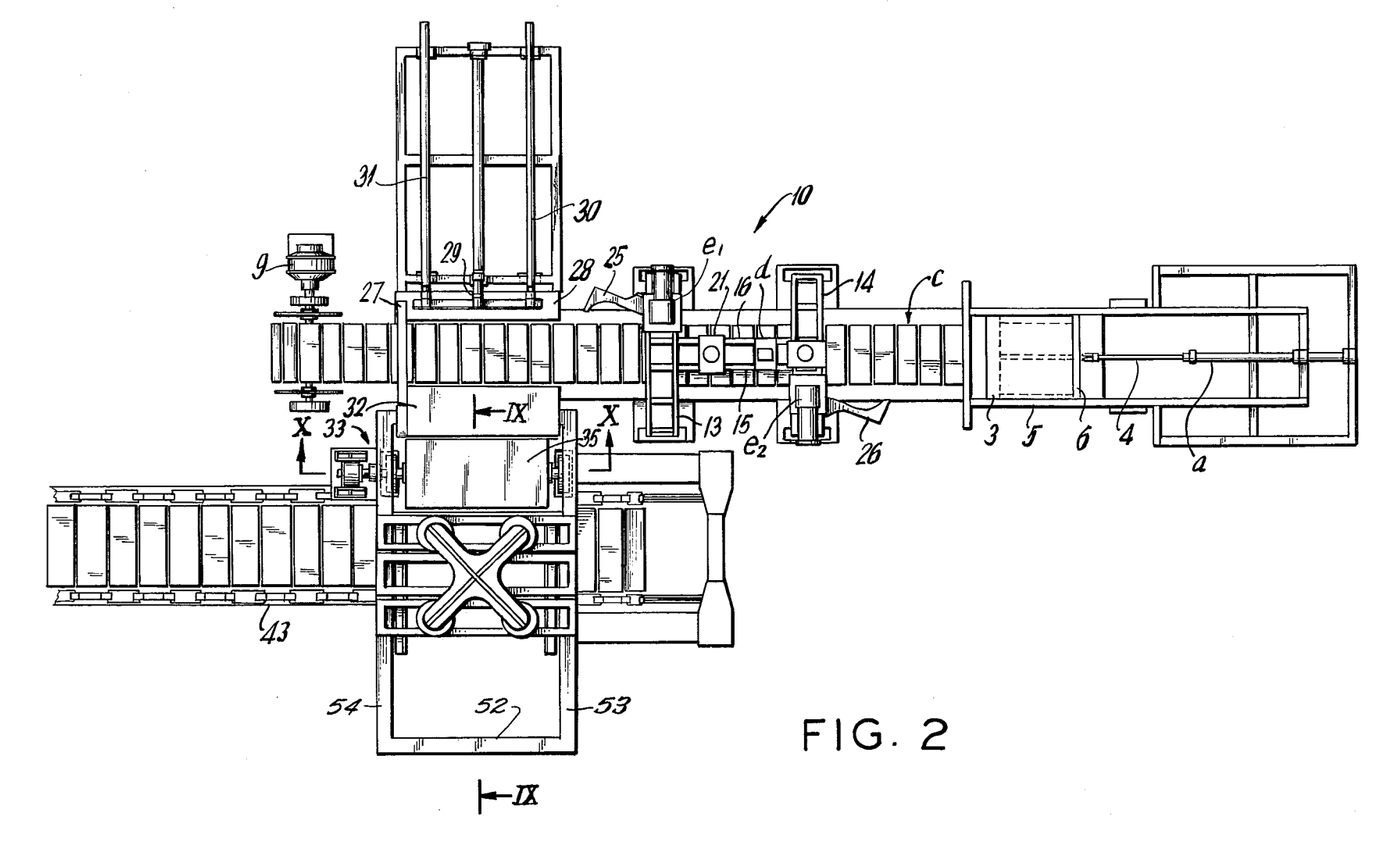
FIG. 2 is a plan view of a preferred embodiment of the apparatus according to the present invention.

Referring to FIG. 2, a second stopper 27 is disposed normal to the advancing direction of the main conveyor c adjacent to the conveying end of the main conveyor c. A fluid cylinder f is disposed horizontally on one side of the main conveyor c adjacent to the second stopper 27 and has a piston rod 29 connected to a push plate 28 which acts to push the ingots engaged by the second stopper 27 in a direction normal to the advancing direction of the main conveyor c. Guide means 30 and 31 are provided on the opposite ends of this push plate 28 to extend in parallel with the piston rod 29 for accurately guiding the movement of the push plate 28 toward and away from the main conveyor c. An ingot transfer table 32 is disposed on the side of the main conveyor c opposite to the side at which the push cylinder f is disposed, and an ingot turning device 33 is disposed adjacent to the ingot transfer table 32, in parallel with the main conveyor c for turning over 180° the legged ingots only.

Figure 10:
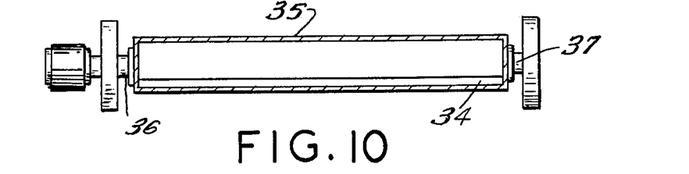
FIG. 10 is a sectional view taken on the line X—X in FIG. 2.

Referring to FIGS. 10 and 11, the ingot turning device 33 comprises a rotary casing 35 having openings at the front and rear ends thereof. A stopper 34 is provided at the rear end of the rotary casing 35. This rotary casing 35 is supported rotatably at the side walls thereof by a pair of shafts 36 and 37, and a rotary actuator g drives the shaft 36 for rotating the rotary casing 35 180°. This ingot turning device 33 operates for turning over 180° the legged ingots only, and the plain ingots can freely pass through the rotary casing 35 to be transferred to the succeeding station when the rotary casing 35 is rotated 180° from the position shown in FIG. 11a to the position shown in FIG. 11d at which the stop lug 34 takes the upper position.

Figure 3:
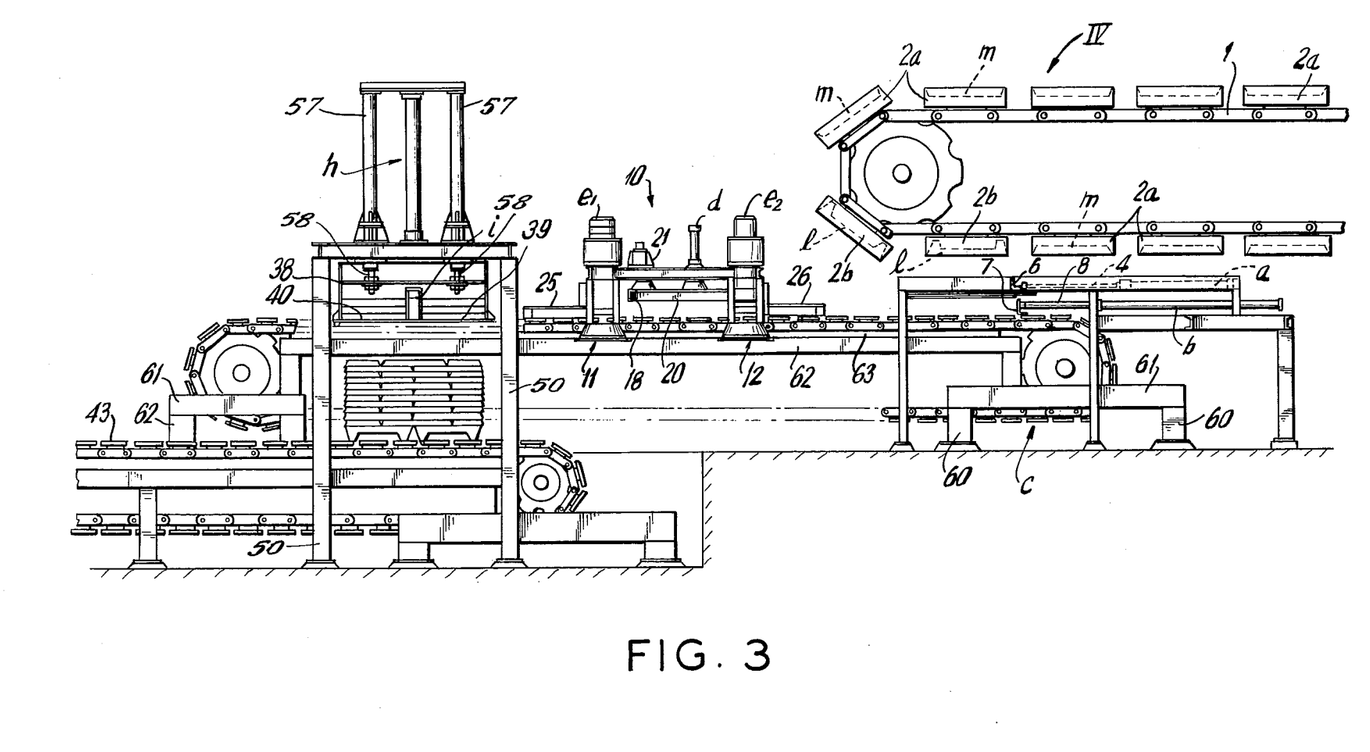
FIG. 3 is a side elevational view of FIG. 2.
Figure 9:
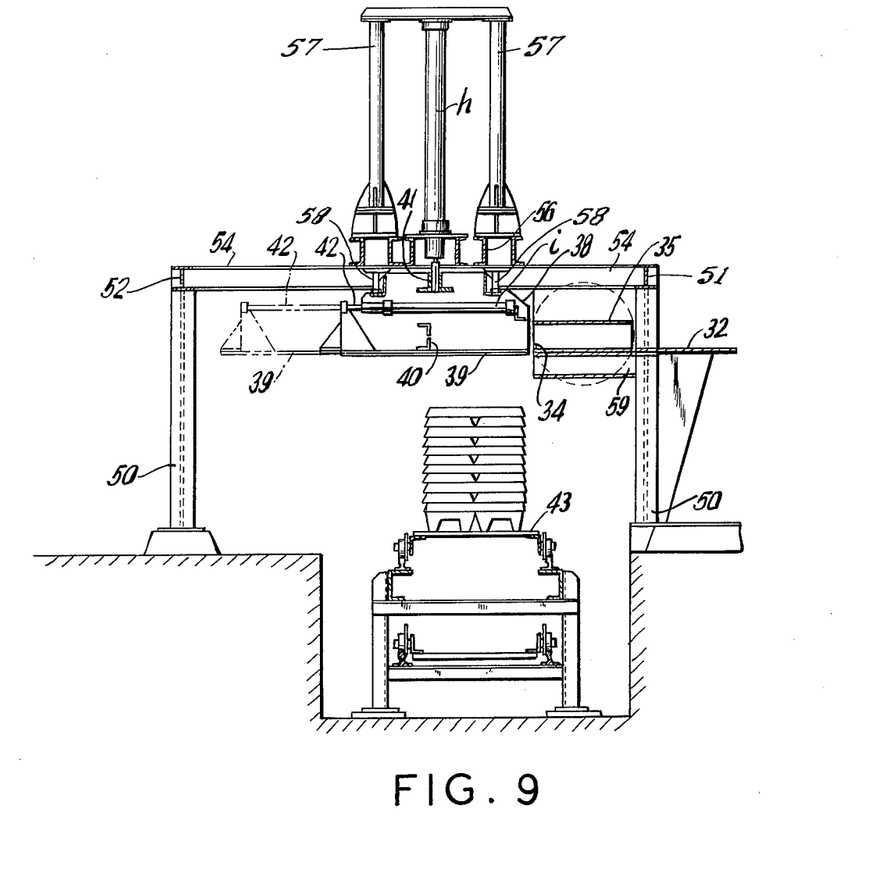
FIG. 9 is a sectional view taken on the line IX—IX in FIG. 2.

Referring to FIGS. 2, 3 and 9, a stacking casing 38 is provided so that the stack units successively passing through the rotary casing 35 can be stacked in tiers on a transfer conveyor 43 to constitute the stack consisting of a predetermined number of stack units. The stacking casing 38 is supported by a support structure 55 composed of I-beams 51, 52, 53 and 54 fixed to four support columns 50 to span across the transfer conveyor 43. A fluid cylinder h is mounted to beams 56 fixed to the beams 53 and 54, and a piston rod 41 of the fluid cylinder h is connected to the stacking casing 38 to cause vertical movement thereof. Four fluid cylinders 57 for guiding the vertical movement of the stacking casing 38 are fixedly mounted on the beams 56, and piston rods 58 of the individual fluid cylinders 57 are connected to the stacking casing 38 to guide the vertical movement of the stacking casing 38 without causing swinging movement. The rotary casing 35 is disposed on a support member 59 fixed to the support columns 50 and beams 53, 54.

The bottom of the stacking casing 38 is openably closed by a stacking plate 39 which is provided to receive the ingots transferred thereon by the operation of the push cylinder f. A stopper 40 is mounted to the stacking casing 38 at a position immediately above the stacking plate 39 and extends across the stacking plate 39 to engage the ingots transferred onto the stacking plate 39. The stacking plate 39 is fixed at one end thereof to a piston rod 42 of a fluid cylinder i to make reciprocating movement by being driven by the fluid cylinder i.

In the embodiment of the present invention described hereinbefore, the main conveyor c is disposed in longitudinally parallel with the chain conveyor 1 carrying the molds 2. However, the main conveyor c may be disposed to run normal to the running direction of the chain conveyor 1. It is essentially necessary that the longitudinal centerline of the ingots being conveyed by the main conveyor c be parallel with the running direction of the main conveyor c. Further, in the illustrated example, 12 stack units are stacked in tiers to constitute the stack. However, the number of the stack units is in no way limited to twelve and may be any desired one provided that it is an even number.

The operation of the apparatus according to the present invention will be described in detail with reference to FIGS. 12, 13 and 14. It is supposed that four ingots $a_1$, $a_2$, $a_3$ and $a_4$, which are each 450 mm long and 225 mm wide, are grouped according to the pattern A to constitute a stack unit as shown in FIG. 1e, and four ingots $b_1$, $b_2$, $b_3$, and $b_4$ of the same size are grouped according to the pattern B to constitute a stack unit as shown in FIG. 1f. It is supposed further that six stack units $A_1$ to $A_6$ of pattern A and six stack units $B_1$ to $B_6$ of pattern B are alternately stacked in 12 tiers to constitute a stack as shown in FIGS. 1g and 1h.

The lowermost layer of the stack thus formed consists of the legged ingots to facilitate insertion of the forks of a fork lift therebeneath. Therefore, in step 1 in FIGS. 12 and 14, a pair of legged ingots $a_1$ and $a_2$ are delivered simultaneously from the molds 2b of the chain conveyor 1 onto the ingot receiving member 3. These legged ingots $a_1$ and $a_2$ are then moved rearward together with the ingot receiving member 3 by actuating the fluid cylinder a. Then, while restricting further movement of the legged ingots $a_1$ and $a_2$ by the stop plate 6 disposed above the receiving member 3, the receiving member 3 is further retracted to deliver the legged ingots $a_1$ and $a_2$ onto the ingot receiving end of the upper run of the main conveyor c disposed beneath the receiving member 3. In step 2 in FIGS. 12 and 14, the main conveyor c is ceased to move, and $a_1$ and $a_2$ delivered in longitudinally parallel relation with each other onto the main conveyor c are then pushed over a predetermined stroke in the advancing direction of the main conveyor c by being pushed by the push plate 7 driven by the fluid cylinder b. In this case, the push stroke of the fluid cylinder b is determined taken into account the size of the ingots. In step 3 in FIGS. 12 and 14, another pair of legged ingots $a_3$ and $a_4$ are similarly delivered onto the ingot receiving member 3, thence onto the main conveyor c by the operation of the fluid cylinder a driving the ingot receiving member 3.

Figure 12:
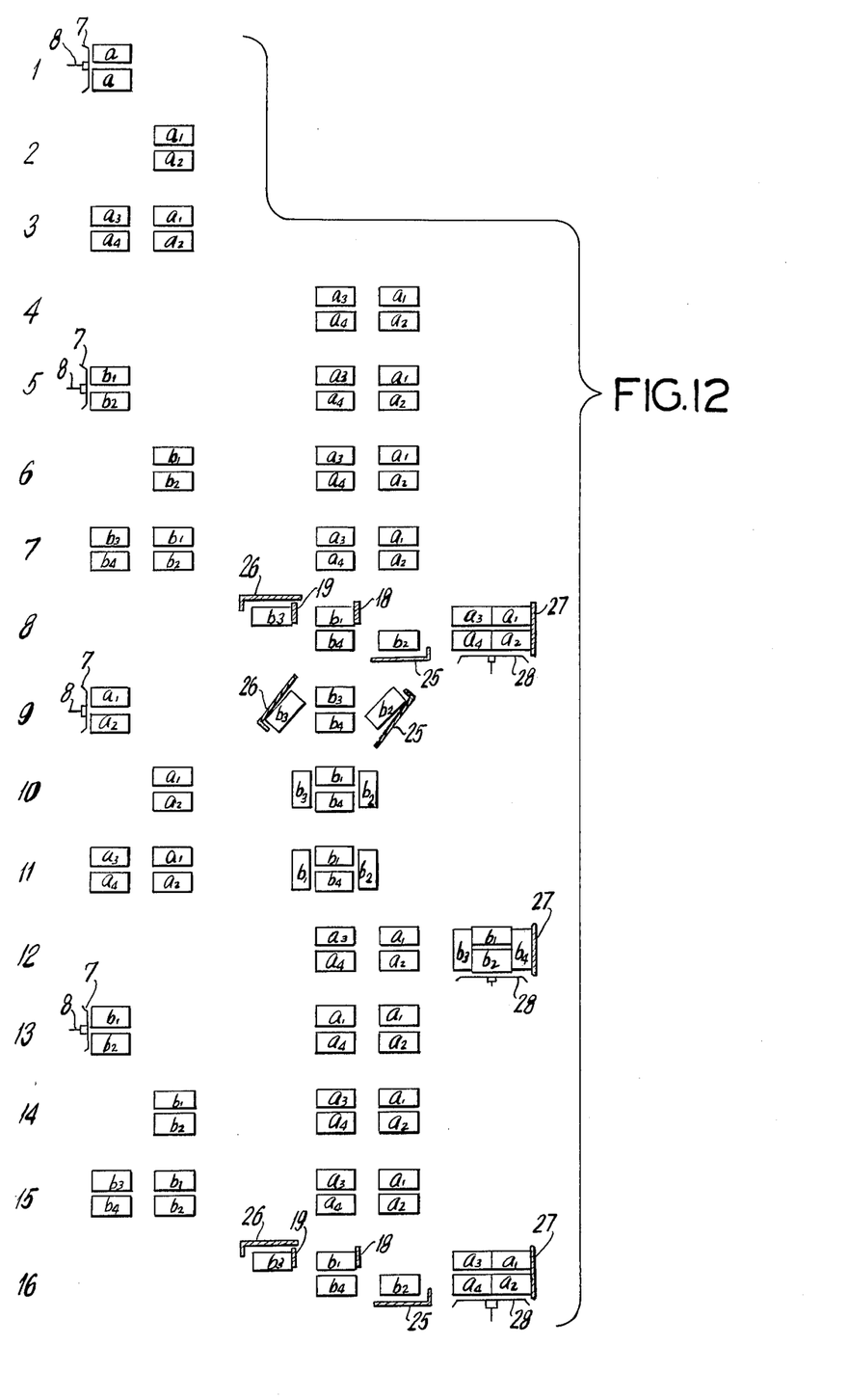
FIGS. 12 and 13 show how the stack consisting of alternate tiers of the stack units of patterns A and B is formed by the apparatus according to the present invention.
Figure 13:
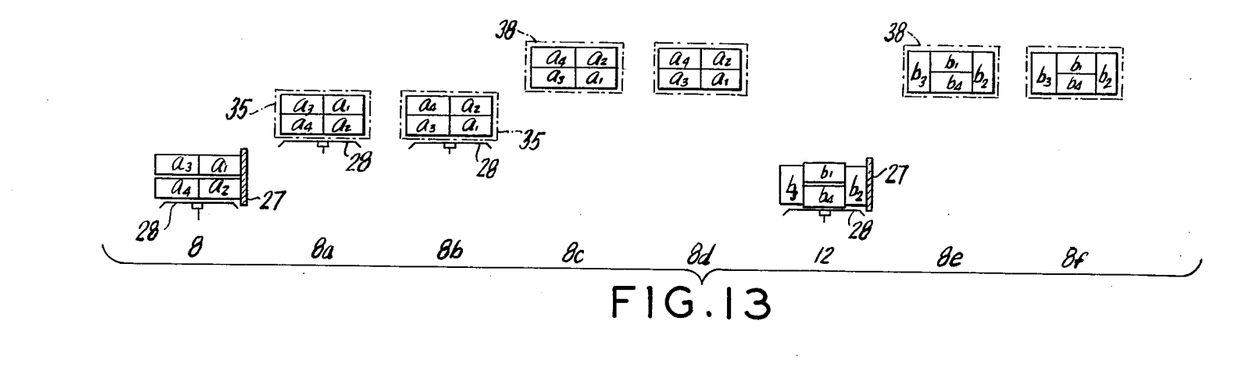
Figure 14:
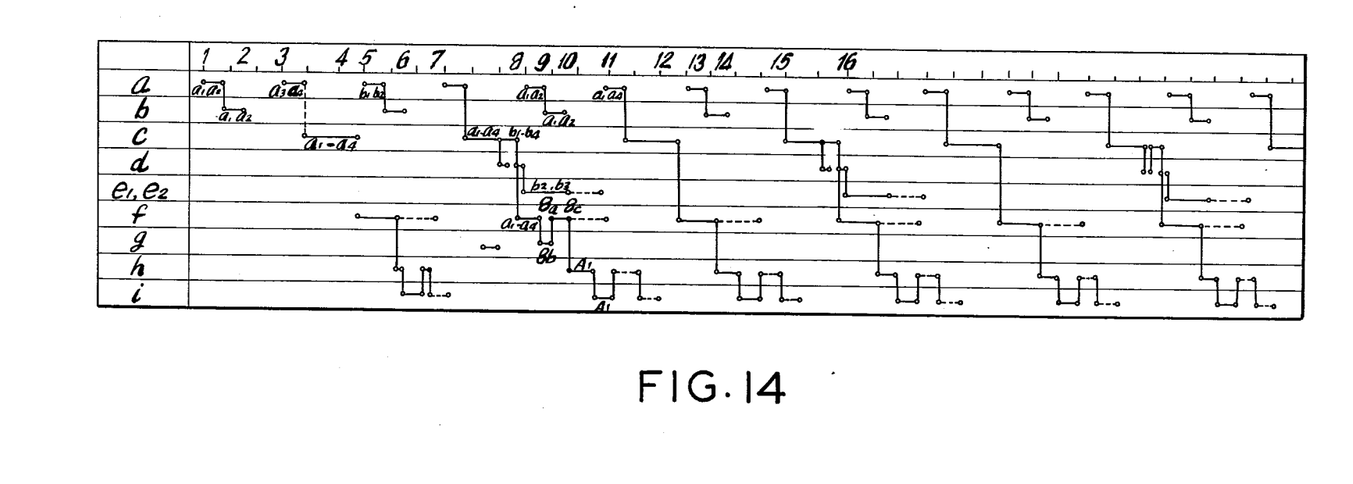
FIG. 14 is a time chart showing the operating cycles of various parts of the apparatus according to the present invention.

In step 4 in FIGS. 12 and 14, the four legged ingots $a_1$, $a_2$, $a_3$ and $a_4$ arranged in a pattern substantially analogous to the pattern A shown in FIG. 1e are conveyed over a predetermined distance with the main conveyor c to provide the lowermost stack unit $A_1$ of the stack. In step 5 in FIGS. 12 and 14, a pair of plain ingots $b_1$ and $b_2$ are delivered similarly from the molds 2 of the chain conveyor 1 onto the ingot receiving member 3, thence onto the main conveyor c after the main conveyor c is stopped. In step 6 in FIGS. 12 and 14, the fluid cylinder b is actuated to drive the push plate 7 thereby pushing forward the plain ingots $b_1$ and $b_2$ over the predetermined stroke on the main conveyor c which is not moving now. In step 7 in FIGS. 12 and 14, another pair of plain ingots $b_3$ and $b_4$ are delivered similarly onto the ingot receiving member 3, thence onto the main conveyor c. The plain ingots $b_3$ and $b_4$ delivered in this step are spaced apart from the previously delivered plain ingots $b_1$ and $b_2$ by the distance corresponding to one push stroke of the fluid cylinder b. These four plain ingots $b_1$ to $b_4$ constitute the stack unit $B_1$ which forms the second lowest layer of the stack. In step 8 in FIGS. 12 and 14, the four legged ingots $a_1$ to $a_4$ (referred to hereinafter as the stack unit $A_1$) arranged substantially in the pattern A are engaged by the second stopper 27 disposed adjacent to the conveying end of the main conveyor c with the movement of the main conveyor c over the predetermined distance, and are brought into intimate contact in the running direction of the main conveyor c. On the other hand, among the four plain ingots $b_1$ to $b_4$ constituting the stack unit $B_1$ following the stack unit $A_1$ on the main conveyor c, the longitudinally aligned plain ingots $b_1$ and $b_3$ are restricted from the advancing movement by being engaged by the respective stop plates 18 and 19 of the first stopper 20 which is now urged downward by the fluid cylinder d, while the longitudinally aligned plain ingots $b_2$ and $b_4$ only are allowed to advance. The main conveyor c is ceased to move when the plain ingot $b_4$ is advanced to a position in which it lies in side-by-side relation with the plain ingot $b_1$.

Figure 11A:
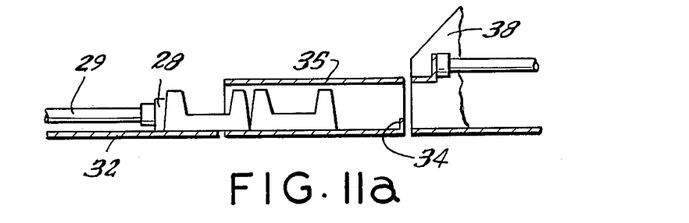
FIGS. 11a to 11d show the structure and operation of ingot turning means.
Figure 11B:
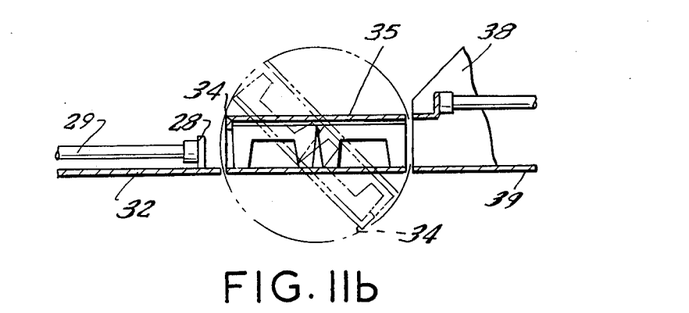
Figure 11C:
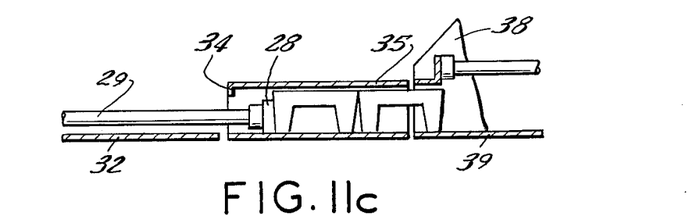
Figure 11D:
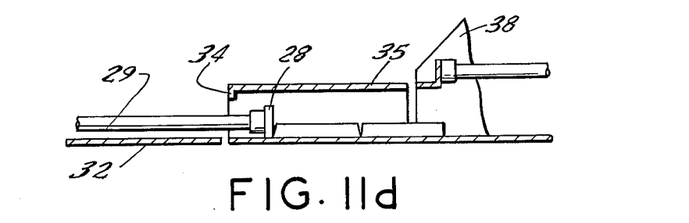

The stack units are successively transferred onto the transfer conveyor 43 from the main conveyor c in a manner as described below. In step 8a in FIGS. 13 and 14, the fluid cylinder f is actuated in response to the stopping of the main conveyor c. The stack unit $A_1$ engaged by the second stopper 27 and thus restricted from further advancing movement is pushed by the push plate 28 into the rotary casing 35 of the ingot turning device 33. In step 9 in FIGS. 12 and 14, another pair of plain ingots $a_1$ and $a_2$ for constituting part of the stack unit $A_2$ forming the third lowest layer of the stack are similarly delivered from the molds 2a of the chain conveyor 1 onto the ingot receiving member 3, thence onto the main conveyor c. In step 10 in FIGS. 12 and 14, these plain ingots $a_1$ and $a_2$ are transferred forward over the predetermined stroke by the action of the fluid cylinder b. In step 9 above described, the rotary actuators $e_1$ and $e_2$ are actuated, and the rotary arms 25 and 26 make swinging movement to rotate 90° both the plain ingot $b_3$, which has been engaged by the first stopper 20 of the pattern changing device 10, and the plain ingot $b_2$, which has not been engaged by the first stopper 20. Thus, the pattern B shown in FIG. 1f can be substantially formed as seen in step 10. In step 8b in FIGS. 13 and 14, the stack unit $A_1$ consisting of the four legged ingots transferred into the rotary casing 35 of the ingot turning device 33 is engaged by the stopper 34 disposed adjacent to the rear lower end of the rotary casing 35. The rotary casing 35 is then rotated 180° by the rotary actuator g thereby turning over 180° the stack unit $A_1$ transferred therein. FIG. 11b shows the state in which the rotary casing 35 containing the stack unit $A_1$ consisting of the four legged ingots therein is being rotated 180° from the position shown in FIG. 11a. The rotary casing 35 thus rotated 180° maintains this state until the successive stack units $A_2$ to $A_6$ and $B_1$ to $B_6$ each consisting of four plain ingots pass therethrough to be stacked in alternate tiers. After the stack unit $B_6$ consisting of the four plain ingots to be stacked to provide the uppermost layer (the twelfth layer counted from the lowermost layer) passes therethrough, the rotary casing 35 is rotated 180° again to be restored to the original position for stopping the legged ingots transferred subsequently thereinto, as will be apparent from the time chart of FIG. 14. In step 8c in FIGS. 13 and 14, the fluid cylinder f is actuated again, and the stack unit $A_1$ consisting of the 180° turned-over legged ingots is forced out of the rotary casing 35 by the push plate 28 as seen in FIG. 11c, and these legged ingots are engaged by the stopper 40 extending across the stacking plate 39 disposed beneath the stacking casing 38. Thus, in this step 8c in FIGS. 13 and 14, these legged ingots are brought into intimate contact in the transverse direction. After the transfer of the stack unit $A_1$ consisting of the four legged ingots $a_1$ to $a_4$ into the stacking casing 38, the stacking casing 38 is urged downward by the fluid cylinder h to a position immediately above the transfer conveyor 43. As soon as the stacking casing 38 is lowered to this position, the fluid cylinder i is actuated to retract the stacking plate 39, and the stack unit $A_1$ engaged by the stopper 40 falls down onto the transfer conveyor 43. This step is shown in 8d in FIGS. 13 and 14. It will be seen from the time chart of FIG. 14 that, during the step 8d in which the fluid cylinder i is actuated to retract the stacking plate 39, another pair of plain ingots $a_3$ and $a_4$ constituting part of the stack unit $A_2$ forming the third lowest layer of the stack are delivered from the molds 2 of the chain conveyor 1 onto the ingot receiving member 3. In step 11 in FIGS. 12 and 14, the receiving member 3 is retracted by being driven by the fluid cylinder a. The plain ingots $a_3$ and $a_4$ received on the receiving member 3 are engaged by the stop plate 6 and are delivered onto the main conveyor c in such a relation that the longitudinal centerline thereof registers with the running direction of the main conveyor c. In step 12 in FIGS. 12 and 14, the stack unit $B_1$ consisting of the four plain ingots arranged substantially in the pattern B are engaged by the second stopper 27 with the movement of the main conveyor c over the predetermined distance and are brought into intimate contact in the advancing direction of the main conveyor c. As soon as the main conveyor c ceases to move, the fluid cylinder f is actuated, and the push plate 28 pushes the stack unit $B_1$ consisting of the four plain ingots through the rotary casing 35 onto the stacking plate 39 disposed beneath the stacking casing 38. This step is shown in 8e in FIGS. 13 and 14. In steps 13 and 14 in FIGS. 12 and 14, another pair of plain ingots $b_1$ and $b_2$ constituting part of the stack unit $B_2$ forming the fourth layer counted from the lowermost layer of the stack are delivered from the molds 2 onto the ingot receiving member 3, thence onto the main conveyor c. The fluid cylinder b is actuated to push these ingots over the predetermined distance on the main conveyor c which is now in the stationary state. After the transfer of the stack unit $B_1$ consisting of the four plain ingots of pattern B into the stacking casing 38, the stacking casing 38 is urged downward by the fluid cylinder $h$ to the position above the stack unit $A_1$ consisting of the four legged ingots of pattern A transferred onto the transfer conveyor 43. The stacking plate 39 is then retracted by the fluid cylinder $i$, and the stack unit $B_1$ consisting of the four plain ingots is delivered from the stacking plate 39 to be stacked on the stack unit $A_1$ consisting of the four legged ingots. These steps are shown in 8e and 8f in FIGS. 13 and 14.

In step 15 in FIGS. 12 and 14, another pair of plain ingots $b_3$ and $b_4$ are delivered from the molds 2 onto the ingot receiving member 3, thence onto the main conveyor $c$. In step 16 in FIGS. 12 and 14, the stack unit $A_2$ consisting of the four plain ingots is engaged by the second stopper 27 with the movement of the main conveyor $c$ over the predetermined distance, and these ingots are brought into intimate contact in the advancing direction of the main conveyor $c$. Among the plain ingots $b_1$ to $b_4$ constituting the stack unit $B_2$ following the stack unit $A_2$, the plain ingots $b_1$ and $b_3$ are engaged by the stop plates 18 and 19 of the first stopper 20 which is now urged downward by the fluid cylinder $d$ in the pattern changing device 10. Subsequently, the rotary actuators $e_1$ and $e_2$ are actuated to cause swinging movement of the rotary arms 25 and 26 thereby changing the direction or attitude of the plain ingots $b_2$ and $b_3$ so as to arrange the plain ingots $b_1$ to $b_4$ according to the pattern B. At the end of the step 16 in FIGS. 12 and 14, the stack unit $A_1$ consisting of the four legged ingots and the stack unit $B_1$ consisting of the four plain ingots are stacked on the transfer conveyor 43, and the stack unit $A_2$ consisting of the four plain ingots is ready to be stacked on the stack consisting of the stack units $A_1$ and $B_1$.

The steps above described are repeated until the six stack units $B_1$ to $B_6$ consisting of the plain ingots of pattern B and the five stack units $A_2$ to $A_6$ consisting of the plain ingots of pattern A are alternately stacked on the stack unit $A_1$ consisting of the legged ingots transferred initially onto the transfer conveyor 43. After these stack units are stacked in predetermined tiers or twelve tiers on the transfer conveyor 43, the transfer conveyor 43 is actuated to transfer the stack to the next step in which the stack is carried by a conveying machine such as a fork lift.

It will be understood from the foregoing detailed description that the method and apparatus according to the present invention are advantageous in that the ingots delivered continuously from an automatic casting apparatus can be stacked in predetermined tiers of alternately different patterns within a length of time which is remarkably short compared with that required hitherto, and that the unreliable stacking operation which has been the neck for the desired automation of continuous casting of non-ferrous metals can be remarkably improved to greatly improve the overall efficiency of continuous casting. Further, by virtue of the fact that the ingots can be grouped and stacked gap-free, the present invention obviates prior art troubles including dangerous relative sliding movement of the ingots which may occur during transportation of the stacked ingots.

We claim:

1. A method of stacking in alternate tiers a plurality of first ingot groups of first predetermined pattern each formed by arranging four ingots in two parallel rows each consisting of a pair of longitudinally aligned ingots, and a plurality of second ingot groups of second predetermined pattern each formed by arranging a pair of ingots in longitudinally parallel relation and disposing another pair of ingots on the longitudinally opposite sides of the former normal thereto, comprising the step of:

delivering one ingot pair from a mold of predetermined shape carried by an endless chain conveyor of a continuous casting apparatus onto an ingot receiving member disposed above an ingot receiving end of a main conveyor and adapted for reciprocating movement in the running direction of said main conveyor so as to arrange the ingots of the ingot pair in longitudinally parallel relation with the running direction of said main conveyor;

retracting said ingot receiving member while restricting the movement of the ingot pair together with the retracting movement of said ingot receiving member thereby feeding the ingot pair onto said main conveyor;

stopping the movement of said main conveyor temporarily and actuating a push plate disposed between said ingot receiving member and said main conveyor and adapted for reciprocating movement in the running direction of said main conveyor thereby advancing the ingot pair to a predetermined position on said main conveyor;

conveying by said main conveyor a plurality of stack units each consisting of two ingot pairs delivered from said molds and arranged in longitudinally parallel relation with the running direction of said main conveyor;

rotating two ingots 90° relative to the remaining two in alternate stack units being conveyed by said main conveyor thereby changing the pattern into another pattern such that the two rotated ingots formerly disposed on the longitudinally opposite sides of and in longitudinally normal relation to the latter two ingots arranged in longitudinally parallel relation with the running direction of said main conveyor are arranged transversely thereto;

transferring the stack units of alternately different patterns across the conveying end of said main conveyor into a rotary casing which acts to turn the ingots upside down so as to direct the legs downward when the stack unit transferred thereinto consists of four legged ingots; and stacking in alternate tiers the stack units of different patterns passed through said rotary casing on a transfer conveyor.

2. A method as claimed in claim 1, wherein said step of rotating the two ingots comprises:

conveying, directly toward the conveying end of said main conveyor, alternate ones of the stack units each consisting of the first and second ingot pairs delivered successively at different timing from said molds and arranged in longitudinally parallel relation with the running direction of said main conveyor;

stopping the movement of the longitudinally aligned ingots in the first and second ingot pairs while conveying the ingot pairs by said main conveyor thereby bringing the trailing ingot in the first ingot pair into side-by-side relation with the leading ingot in the second ingot pair; and stopping the movement of said main conveyor temporarily and rotating the leading ingot in the first ingot pair and the trailing ingot in the second ingot pair 90° relative to the remaining ingots.

3. An apparatus for stacking in alternate tiers a plurality of first ingot groups of first predetermined pattern each formed by arranging four ingots in two parallel rows each consisting of a pair of longitudinally aligned ingots, and a plurality of second ingot groups of second predetermined pattern each formed by arranging a pair of ingots in longitudinally parallel relation and disposing another pair of ingots on the longitudinally opposite sides of the former normal thereto, comprising:

an endless chain conveyor forming part of a continuous casting apparatus and having a pair of parallel mold trains each including a predetermined number of molds for casting a plain ingot and two molds for casting a legged ingot, the transversely adjacent ones of said molds in said mold trains being of the same type;

an endless conveyor having the ingot receiving end thereof disposed beneath the delivery end of said chain conveyor for successively receiving the ingot pairs delivered from said molds in longitudinally parallel relation with the running direction thereof so as to convey a plurality of stack units each consisting of the first and second ingot pairs delivered at different timing from said molds and arranged in longitudinally parallel relation with the running direction of said main conveyor;

pattern changing means mounted to a frame structure spanning across said main conveyor and including stopper means retractably advanced to engage the longitudinally aligned ingots in the first and second ingot pairs while conveying the ingot pairs by said main conveyor thereby bringing the trailing ingot in the first ingot pair into side-by-side relation with the leading ingot in the second ingot pair, and a first and a second arm swingably mounted to said frame structure for rotating the leading ingot the first ingot pair and the trailing ingot in the second ingot pair 90° relative to the remaining two ingots respectively;

a push plate for urging the stack units of alternately different patterns one after another across said main conveyor;

a rotary casing disposed adjacent to the conveying end of said main conveyor for receiving therein the stack units of alternately different patterns forced one after another by said push plate across said main conveyor, said rotary casing operating to turn the ingots upside down so as to direct the legs downward when the stack unit transferred thereinto consists of four legged ingots, and means disposed adjacent to said rotary casing for receiving the stack units of alternately different patterns passed one after another through said rotary casing and stacking the stack units in alternate tiers on a transfer conveyor disposed therebeneath.

4. An apparatus as claimed in claim 3, further comprising:

an ingot receiving member disposed between said chain conveyor and said main conveyor for horizontal reciprocating movement; and a stopper extending across said ingot receiving member above the moving path of said ingot receiving member for engaging and restricting the movement of each ingot pair together with the retracting movement of said ingot receiving member thereby feeding the ingot pair onto said main conveyor when said ingot receiving member is retracted.

5. An apparatus as claimed in claim 4, further comprising a push plate disposed between said ingot receiving member and said main conveyor and connected to a fluid cylinder for reciprocating movement in the running direction of said main conveyor, thereby moving each ingot pair to a predetermined position on said main conveyor in the state in which said main conveyor is temporarily stopped.

6. An apparatus as claimed in claim 3, wherein said pattern changing means comprises:

a pair of spaced gantry-like frame structures each formed by a pair of columns and cross members connecting the upper ends of said columns, said frame structures spanning across said main conveyor;

interconnecting beams for said cross members of said gantry-like frame structures;

a fluid cylinder mounted on said beams and having a piston rod operatively connected to said stopper means for retractably advancing said stopper means to a position at which said stopper means engages the longitudinally aligned ingots in the ingot pairs;

a first rotary actuator mounted on the cross members of one of said frame structures to cause the swinging movement of said first arm; and a second rotary actuator mounted on the cross members of the other said frame structure to cause the swinging movement of said second arm.

7. An apparatus as claimed in claim 3, wherein said rotary casing comprises:

a body formed by a pair of a first and a second plate connected in parallel relation by a pair of end plates and having the opposite sides thereof opened to permit passage of the stack units therethrough;

a stopper protruding inwardly into said body from said first plate for normally restricting the passage of the stack units through said body; and a rotary actuator operatively connected to a shaft extending from one of said end plates;

whereby, when the stack unit consisting of legged ingots is transferred into said rotary casing, the stack unit is engaged by said stopper and then said rotary casing is rotated thereby turning upside down the legged ingots, while when the stack unit consisting of plain ingots is transferred into said rotary casing, said stopper takes such a position at which the stack unit is allowed to freely pass through said rotary casing.

8. An apparatus as claimed in claim 3, wherein said stacking means comprises:

a frame structure spanning across said transfer conveyor;

a vertically movable stacking casing connected to a piston rod of a fluid cylinder mounted on said frame structure;

means for transferring the stack units of alternately different patterns one after another into said stacking casing;

a movable member providing the bottom of said stacking casing and adapted for reciprocating movement in the transverse direction of said main conveyor; and a stopper extending above said movable member in a direction normal to the reciprocating direction thereof for restricting the movement of each stack unit with the retracting movement of said movable member thereby feeding the stack units of alternately different patterns one after another onto said transfer conveyor when said movable member is retracted.

* * * * *